(12) United States Patent
Morgan et al.

(10) Patent No.: US 11,745,424 B2
(45) Date of Patent: Sep. 5, 2023

(54) BUILDING MATERIAL ENCLOSURE COMPRISING A THERMAL BREAK

(71) Applicant: Formlabs, Inc., Somerville, MA (US)

(72) Inventors: Robb Morgan, Arlington, MA (US); Luke Plummer, Jericho, VT (US); Christopher Auld, Boston, MA (US)

(73) Assignee: Formlabs, Inc., Somerville, MA (US)

( * ) Notice: Subject to any disclaimer, the term of this patent is extended or adjusted under 35 U.S.C. 154(b) by 123 days.

(21) Appl. No.: 17/022,401

(22) Filed: Sep. 16, 2020

(65) Prior Publication Data
US 2021/0107063 A1    Apr. 15, 2021

Related U.S. Application Data

(60) Provisional application No. 62/901,359, filed on Sep. 17, 2019.

(51) Int. Cl.
| | |
|---|---|
| *B33Y 30/00* | (2015.01) |
| *B29C 64/153* | (2017.01) |
| *B29C 64/255* | (2017.01) |
| *B29C 64/25* | (2017.01) |
| *B28B 1/00* | (2006.01) |
| *B29C 64/295* | (2017.01) |

(52) U.S. Cl.
CPC ............ *B29C 64/255* (2017.08); *B28B 1/001* (2013.01); *B29C 64/25* (2017.08); *B33Y 30/00* (2014.12); *B29C 64/153* (2017.08); *B29C 64/295* (2017.08)

(58) Field of Classification Search
CPC ..... B29C 64/153; B29C 64/295; B29C 64/25; B29C 64/255; B22F 12/38
See application file for complete search history.

(56) References Cited

U.S. PATENT DOCUMENTS

| | | | |
|---|---|---|---|
| 10,363,603 B2 * | 7/2019 | Boswell | ................. B22F 10/20 |
| 2011/0168091 A1 | 7/2011 | Baumann et al. | |
| | | (Continued) | |

FOREIGN PATENT DOCUMENTS

| | | |
|---|---|---|
| EP | 3 124 139 A1 | 2/2017 |
| EP | 3 434 479 A1 | 1/2019 |

OTHER PUBLICATIONS

International Search Report and Written Opinion dated Dec. 21, 2020 in connection with International Application No. PCT/US2020/051007.

*Primary Examiner* — Leith S Shafi
*Assistant Examiner* — Nicholas J Chidiac
(74) *Attorney, Agent, or Firm* — Wolf, Greenfield & Sacks, P.C.

(57) ABSTRACT

According to some aspects, degradation of material in a sintering additive fabrication process may be mitigated or avoided by fabricating parts within a chamber that includes one or more thermal breaks. The thermal break may be implemented using a variety of structures, but generally allows material in the chamber close to the surface to be maintained at different temperatures than the material further from the surface. For instance, as a result of the thermal break, parts located within the material of the chamber that were formed earlier during fabrication may be kept cooler to avoid damage to the parts yet the upper surface (sometimes called the "build surface") of unconsolidated material may be heated enough so as to require minimal additional energy exposure to trigger consolidation.

6 Claims, 4 Drawing Sheets

(56) References Cited

U.S. PATENT DOCUMENTS

| | | | |
|---|---|---|---|
| 2016/0288412 A1 | 10/2016 | Stamppfl et al. | |
| 2017/0028471 A1* | 2/2017 | Boswell | B22F 3/1017 |
| 2017/0291364 A1* | 10/2017 | Womer | B29C 64/106 |
| 2018/0079033 A1* | 3/2018 | Krueger | B23K 26/702 |
| 2021/0206104 A1* | 7/2021 | Laws | B29C 64/153 |
| 2022/0072786 A1* | 3/2022 | Weiss | H05B 3/265 |

* cited by examiner

BUILDING MATERIAL ENCLOSURE COMPRISING A THERMAL BREAK

CROSS REFERENCE TO RELATED APPLICATIONS

The present application claims the benefit under 35 U.S.C. § 119(e) of U.S. Provisional Patent Application No. 62/901,359, filed Sep. 17, 2019, titled "Techniques For Thermal Management In Additive Fabrication And Related Systems And Methods," which is hereby incorporated by reference in its entirety

BACKGROUND

Additive fabrication, e.g., 3-dimensional (3D) printing, provides techniques for fabricating objects (also referred to as "parts") by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, selective laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as selective laser sintering, or "SLS," solid objects are created by successively forming thin layers by selectively fusing together powdered material. One illustrative description of selective laser sintering may be found in U.S. Pat. No. 4,863,538, incorporated herein in its entirety by reference.

SUMMARY

According to some aspects, an additive fabrication device is provided configured to produce three-dimensional objects by sintering a source material, the device comprising a chamber, a material deposition mechanism, a fabrication platform arranged within the chamber configured to receive source material from the material deposition mechanism and to be lowered into the chamber as progressive layers of source material are deposited and sintered over the fabrication platform, and one or more heaters configured to heat at least the source material deposited by the material deposition mechanism, wherein the chamber comprises a thermal break.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
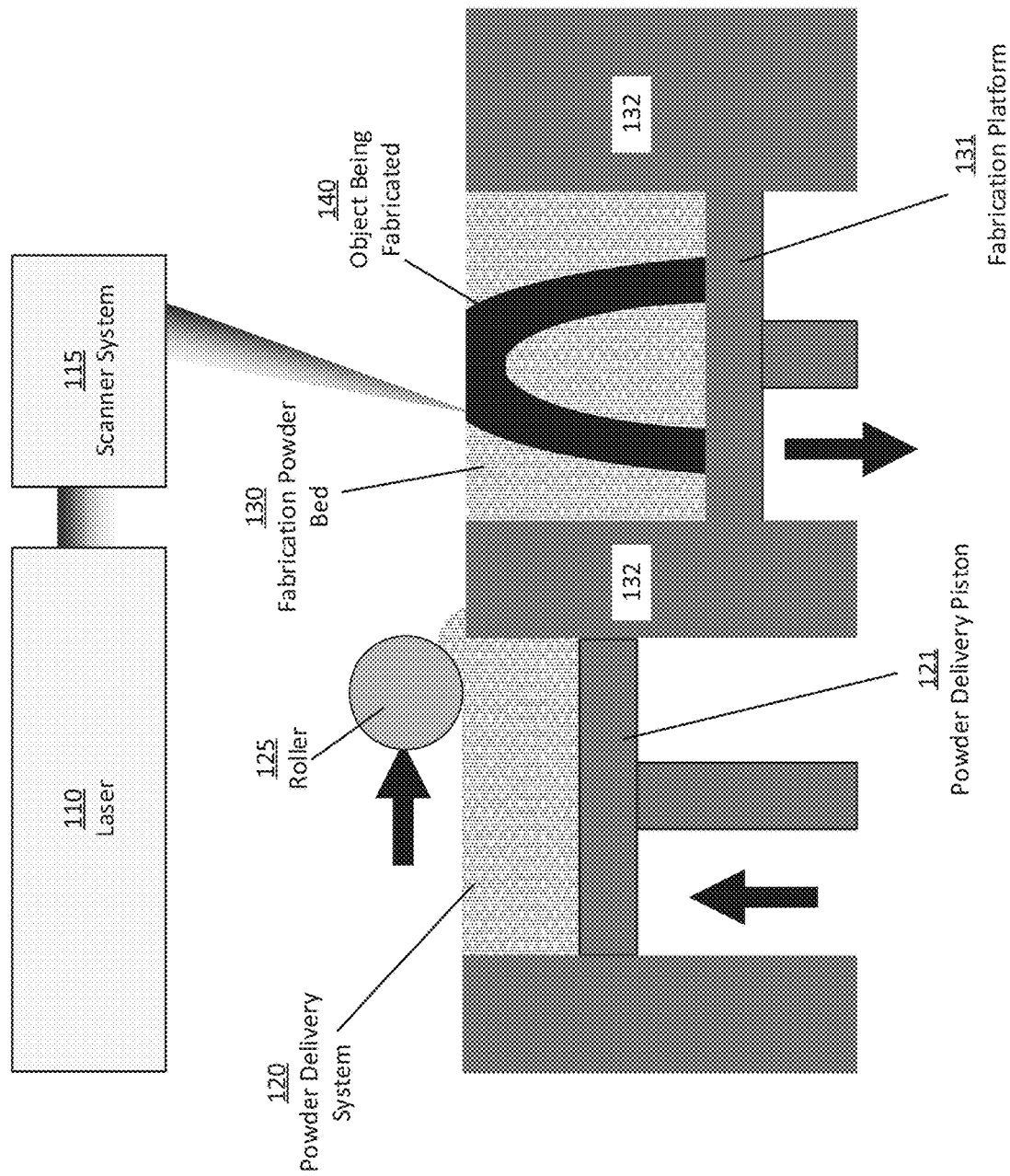
FIG. 1 depicts an illustrative selective laser sintering device, according to some embodiments.

Some additive fabrication techniques, such as Selective Laser Sintering (SLS), form parts by fusing source material, such as one or more fine powders, together into larger solid masses. This process of fusing a source material is referred to herein as "consolidation," and typically occurs by directing sufficient energy (e.g., heat and/or light) to the material to cause consolidation. Some energy sources, such as lasers, allow for direct targeting of energy into a small area or volume. Other energy sources, such as heat beds or heat lamps, direct energy into a comparatively broader area or volume of material. Since consolidation of source material typically occurs at or above a critical temperature, producing parts as intended requires effective management of temperature within the source material.

In order to form a part via sintering techniques from a plurality of layers, a layer of unconsolidated material is deposited onto a fabrication bed and then heated in desired locations to consolidate regions of the layer. The additional layer of unconsolidated material is then deposited onto the fabrication bed over the first layer and further regions consolidated, and so forth until the part is formed. As such, a volume of material is gradually deposited in a volume that contains both unconsolidated material and consolidated material.

In some additive fabrication systems, the unconsolidated source material is preheated to a temperature that is sufficiently high so as to require minimal additional energy exposure to trigger consolidation. For instance, some conventional systems utilize radiative heating elements that aim to consistently and uniformly heat both the uppermost layer and the volume of the material to a temperature below, but close to, the critical temperature for consolidation. A laser beam or other energy source directed at the material may then provide sufficient energy to reach the critical temperature and thereby cause consolidation. However, maintaining an elevated temperature in this manner prior to consolidation, sometimes referred to as "preheating," poses numerous technical challenges.

Consistency of the temperature of preheated unconsolidated material may be critical to the successful fabrication of parts using the selective sintering process. In particular, the system should preferably maintain the temperature of the preheated unconsolidated material at as close to a constant temperature as feasible so that the total amount of energy delivered to an area of unconsolidated material by the exposure source can be minimized. In addition, since an amount of heating of unconsolidated material may be a function of both the energy exposure and the temperature of the material, maintaining the unconsolidated material at a consistent temperature allows the temperature increase of material to be accurately predicted for a given energy exposure amount.

Additionally, when consolidating the material, the system should preferably maintain the temperature of the material at or above its consolidation temperature for a sufficient time for the consolidation process to complete. Moreover, underheating of the material during fabrication may result in a failure of the material to consolidate and/or may result in inferior material properties within the fabricated part. As a result of these factors, consistent and even preheating of the unconsolidated material is highly desirable.

The inventors have recognized and appreciated that techniques to heat a volume of material may, however, result in degradation of the material. For instance, some preheating techniques may heat the volume of material using a heated plate, cage or other structure arranged in proximity and/or in contact with the material. Heating the entire volume of material may, however, cause the unconsolidated and/or consolidated material to degrade over time, and may require an unnecessarily large amount of energy. In some cases, for example, the material properties of parts represented by the consolidated material may be impacted when the parts are heated for a prolonged period of time. In particular, prolonged heating of the entire volume of consolidated and unconsolidated material near the consolidation temperature during the fabrication process may alter or limit material properties of fabricated parts including decreasing ductility and/or overall mechanical strength. In some cases, prolonged heating of the unconsolidated material may limit the recyclability of the unconsolidated material. Unconsolidated material can sometimes be re-used in subsequent fabrication, but prolonged heating of the unconsolidated material may damage the material sufficiently that it should no longer be re-used due to degradation in material properties or flow characteristics.

The above issues represent challenges to even heating of the unconsolidated material in that it is desirable to apply heat to the volume of material during fabrication in order to achieve a consistent temperature across the entire build area, but doing so may lead to the above-described undesirable effects. Ideally the temperature of the unconsolidated material at the surface of the volume of material would be heated evenly and hot enough so as to require minimal additional energy exposure to trigger consolidation, yet not heated enough to cause degradation of the material beneath, as described above.

The inventors have recognized that degradation of material in a sintering additive fabrication process may be mitigated or avoided by fabricating parts within a chamber that includes one or more thermal breaks. The thermal break may be implemented using a variety of structures, but generally allows material in the chamber close to the surface to be maintained at different temperatures than the material further from the surface. For instance, as a result of the thermal break, parts located within the material of the chamber that were formed earlier during fabrication may be kept cooler to avoid damage to the parts yet the upper surface (sometimes called the "build surface") of unconsolidated material may be heated enough so as to require minimal additional energy exposure to trigger consolidation.

According to some embodiments, a thermal break may be implemented within a chamber in a sintering additive fabrication process by including material having a lower thermal conductivity that the bulk of the chamber material. For example, a chamber may comprise walls largely formed from a primary material (e.g., a first metal), but may also include one or more wall sections formed from a secondary material (e.g., plastic, a ceramic, and/or another metal). If the one or more wall sections formed from the secondary material are arranged at an appropriate position in the chamber (e.g., close to the top of the chamber), they may limit the effect that heating of the uppermost portion of the contents of the chamber has upon lower portions of the contents of the chamber.

As used herein, a "thermal break" refers at least to any portion of a structure configured to hold unconsolidated material in a sintering additive fabrication process, where the portion has a different thermal conductivity than some other portion of the structure (e.g., the remainder of the structure). Thermal breaks may include, but are not limited to, sections of the walls of the structure that consist of different materials to other sections of the walls of the structure. Various examples of thermal breaks are discussed below.

Following below are more detailed descriptions of various concepts related to, and embodiments of, thermal management techniques for additive fabrication. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

An illustrative conventional selective laser sintering (SLS) additive fabrication device is illustrated in FIG. 1. In the example of FIG. 1, SLS device 100 comprises a laser 110 paired with a computer-controlled scanner system 115 disposed to operatively aim the laser 110 at the fabrication bed 130 and move over the area corresponding to a given cross-sectional area of a computer aided design (CAD) model representing a desired part. Suitable scanning systems may include one or more mechanical gantries, linear scanning devices using polygonal mirrors, and/or galvanometer-based scanning devices.

In the example of FIG. 1, the material in the fabrication bed 130 may be selectively heated by the laser in a manner that causes the powder material particles to fuse (sometimes also referred to as "sintering" or "consolidating") such that a new layer of the object 140 is formed. SLS is suitable for use with many different powdered materials, including any of various forms of powdered nylon. In some cases, areas around the fabrication bed (e.g., the walls 132, the platform 131, etc.) may include heating elements to heat the powder in the fabrication bed. Such heaters may be used to preheat unconsolidated material, as discussed above, prior to consolidation via the laser.

Once a layer has been successfully formed, the fabrication platform 131 may be lowered a predetermined distance by a motion system (not pictured in FIG. 1). Once the fabrication platform 131 has been lowered, the material deposition mechanism 125 may be moved across the fabrication bed 130, spreading a fresh layer of material across the fabrication bed 130 to be consolidated as described above. Mechanisms configured to apply a consistent layer of material onto the fabrication bed may include the use of wipers, rollers, blades, and/or other levelling mechanisms for moving material from a source of fresh material to a target location.

Since material in the powder bed 130 is typically only consolidated in certain locations by the laser, some material will generally remain within the bed in an unconsolidated state. This unconsolidated material is sometimes referred to as a "part cake." In some embodiments, the part cake may be used to physically support features such as overhangs and thin walls during the formation process, allowing for SLS systems to avoid the use of temporary mechanical support structures, such as may be used in other additive manufacturing techniques such as stereolithography. In addition, this may further allow parts with more complicated geometries, such as moveable joints or other isolated features, to be printed with interlocking but unconnected components.

The above-described process of producing a fresh layer of powder and consolidating material using the laser repeats to form an object layer-by-layer until the entire object has been fabricated. Once the object has been fully fabricated, the object and the part cake may be cooled at a controlled rate so as to limit issues that may arise with fast cooling, such as warping or other distortion due to variable rate cooling. The object and part cake may be cooled while within the selective laser sintering apparatus, or removed from the apparatus after fabrication to continue cooling. Once fully cooled, the object can be separated from the part cake by a variety of methods. The unused material in the part cake may optionally be recycled for use in subsequent fabrication.

One illustrative benefit that may be realized by some embodiments described herein is that the process of cooling the powder may begin during the fabrication process, which may reduce the total time necessary to cool the fabricated object within or outside of the machine but after the fabrication process. By controlling the temperature between thermal breaks, it is possible to achieve the same limited distortion or warping that may arise due to cooling the consolidated material too quickly.

As discussed above, it is desirable to heat the surface of the part cake during fabrication to facilitate consistent consolidation of material, but this may also cause lower portions of the part cake, which may include consolidated material, to be exposed to heat, which may result in damage to the material. As also discussed above, the inventors have recognized and appreciated that degradation of material in a sintering additive fabrication process may be mitigated or avoided by fabricating a chamber to include one or more thermal breaks.

Figure 2:
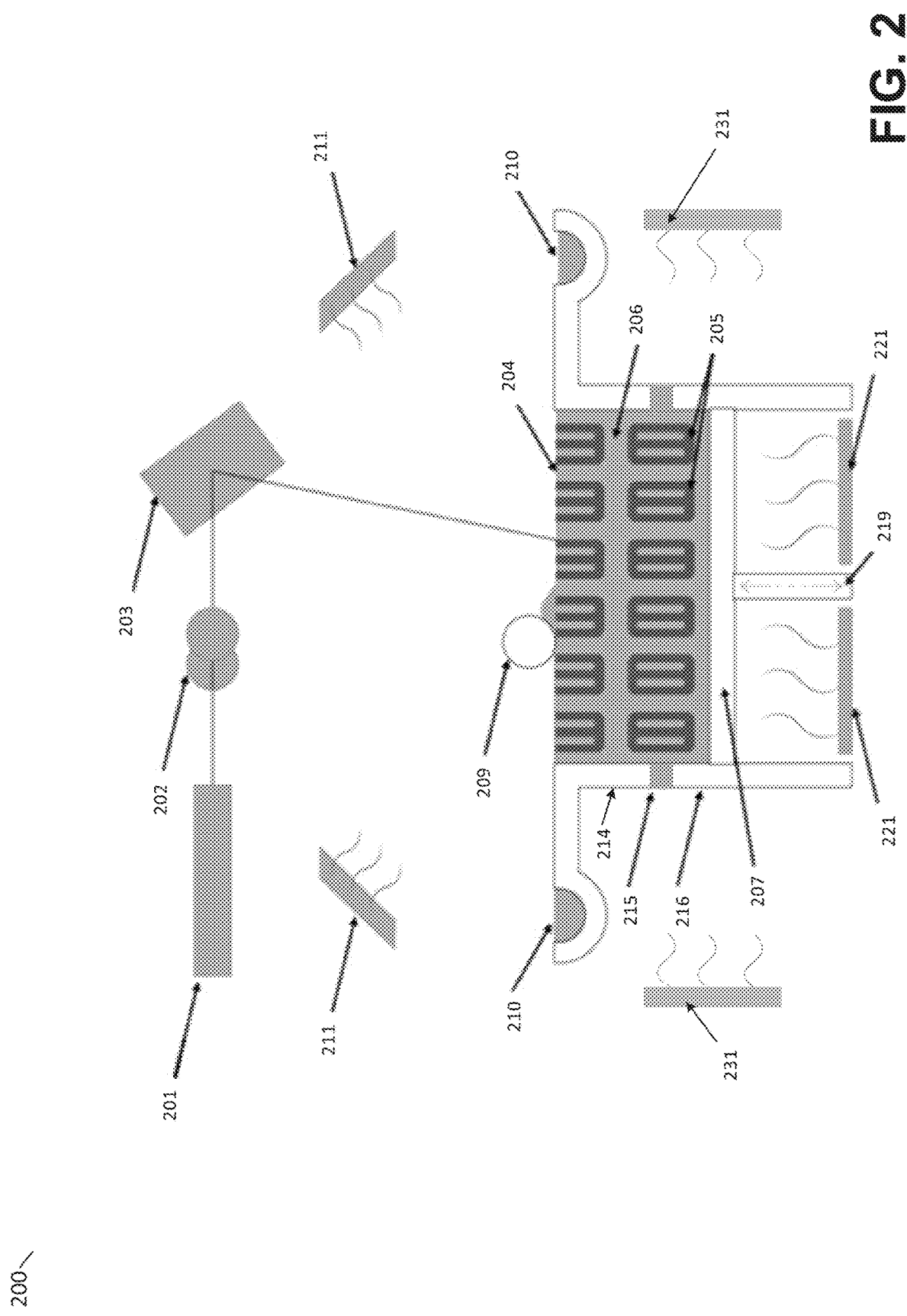
FIG. 2 depicts a cross-sectional view of an illustrative selective laser sintering device that includes a chamber comprising a thermal break, according to some embodiments.

FIG. 2 depicts a cross-sectional view of an illustrative selective laser sintering device that includes a chamber that comprises a thermal break, according to some embodiments. In the example of FIG. 2, SLS device 200 comprises a laser 201, optical component(s) 202 (e.g., lenses, mirrors, etc.) and a computer-controlled mirror galvanometer 203 disposed to operatively aim laser light at the fabrication bed 204. A roller 209 is configured to deposit material from reservoirs 210 onto the fabrication bed 204, which is supported by fabrication platform 207 and a chamber comprising wall sections 214, 215 and 216. The fabrication platform may be raised and lowered by a delivery mechanism 219. The example of FIG. 2 illustrates the SLS device 200 part way through a fabrication process. As such, parts 205 comprising consolidated material are arranged within the powder bed along with unconsolidated material 206.

Heaters 211 are arranged to direct heat onto the surface of the powder bed, heaters 221 are arranged to heat the underside of the fabrication bed, and heaters 213 are arranged to heat the sides of the chamber. These heaters may work in concert to deliver a desired amount of heat to the powder bed. For instance, heaters 221 may be configured to evenly heat the entire powder bed to a comparatively lower temperature (although above room temperature), while heaters 211 are configured to heat the upper surface of the powder bed to a comparatively higher temperature. Heaters 211, 221 and/or 231 may be coupled to separate closed loop controls such that the temperature of an associated region of the chamber may be monitored and controlled using a feedback process.

In the example of FIG. 2, heaters 211, 221 and 231 are provided as illustrative examples of heaters, but it will be appreciated that an additive fabrication device may not necessarily include each of these heaters, and may include others heaters in other locations and any suitable combination of heater types. For instance, heaters 211, 221 and 231 are depicted in FIG. 2 as radiative heaters, but conductive heaters may also be employed as heaters 211, 221 and/or 231 and/or other heaters within the device 200. Conductive heaters may for example, be attached to the walls of the chamber and/or arranged within a structure otherwise proximate to the fabrication bed 204.

In the example of FIG. 2, section 215 of the chamber may be considered a thermal break in that the ability of the chamber walls to conduct heat from chamber section 214 to chamber section 216 may be limited by the thermal break 215. For instance, heat in the uppermost region of the powder bed 204 may propagate to lower parts of the powder bed through conduction, which may occur through walls of the chamber and through the powder bed itself. In many cases, the material of the powder bed may have a lower thermal conductivity than the walls of a chamber (e.g., the powder may be nylon and the chamber may be metal). Moreover, a powder may generally be expected to be less thermally conductive than a solid material. As such, the primary path for thermal transfer downward in the powder bed may be expected to be the chamber walls (and/or other structural parts of the chamber). By introducing thermal break 215 in the chamber, heat transfer from the upper region of the powder bed to lower regions of the powder bed may be significantly reduced while still allowing heat to be evenly distributed over the upper region via the thermally conductive section 214.

According to some embodiments, thermal break 215 may comprise a different material than the rest of the chamber (or, at least, a different material than other regions of the chamber to which the thermal break is proximate). For instance, chamber sections 214 and 216 may comprise a metal such as steel and/or aluminum, whereas thermal break 215 may comprise a less thermally conductive material such as ceramic and/or plastic (e.g., polyetheretherketone (PEEK)). In some embodiments, thermal break 215 may comprise an air gap (being a complete break between chamber sections) and/or may comprise a thinner section of the chamber wall (e.g., a notch within the wall).

According to some embodiments, the thermal break 215 may have a different wall thickness than the chamber section 214 and/or the chamber section 216. Varying the wall thickness as well as the height of the thermal break may allow for tuning of the amount of heat transfer through the walls of the container.

According to some embodiments, thermal break 215 may be formed from a joint between chamber sections 214 and 216. For example the chamber sections 214 and 216 may be welded or otherwise joined together and the joint between the two sections may represent the thermal break 215. In some cases, a thermal joint may be formed from a different material than the chamber sections 214 and 216.

While thermal break 215 is illustrated in the example of FIG. 2 as a piece of material completely separating the chamber sections 214 and 216, it will be appreciated that in general the thermal break need not occupy only the space between the chamber sections. For instance, when molding a piece of material such as plastic for thermal break 215, parts of the thermal break may extend over sides of the chamber sections in addition to being formed in between the chamber sections. As such, it will be appreciated that the thermal break 215 may have any suitable shape so long as the break has a different thermal conductivity than chamber section 214 and so long as the break provides some measure of separation between chamber section 214 and chamber section 216.

According to some embodiments, thermal break 215 may be arranged around part, but not all of, the perimeter of the chamber. For instance, the thermal break may comprise multiple separate pieces of material introduced into the walls of the chamber that do not extend all the way around the chamber.

According to some embodiments, the thermal break 215 may have a height that is greater than or equal to 0.1%, 0.5%, 1%, 2%, or 4% of the height of the chamber (that is, the total height of elements 214, 215 and 216 combined). According to some embodiments, the thermal break 215 may have a height that is less than or equal to 0.2%, 0.5%, 1%, 2%, or 4% of the height of the chamber. Any suitable combinations of the above-referenced ranges are also possible (e.g., a height greater than or equal to 0.1% of the height of the chamber and less than or equal to 1% of the height of the chamber). According to some embodiments, the thermal break 215 may have a height that is greater than or equal to 1 mm, 2 mm, 5 mm, 10 mm or 25 mm. According to some embodiments, the thermal break 215 may have a height that is less than or equal to 2 mm, 5 mm, 10 mm, 20 mm, 50 mm or 100 mm. Any suitable combinations of the above-referenced ranges are also possible (e.g., a height greater than or equal to 1 mm and less than or equal to 10 mm). According to some embodiments, the thermal break 215 may be arranged within the top 2%, 5%, 8% or 10% of the total height of the chamber.

Figure 3:
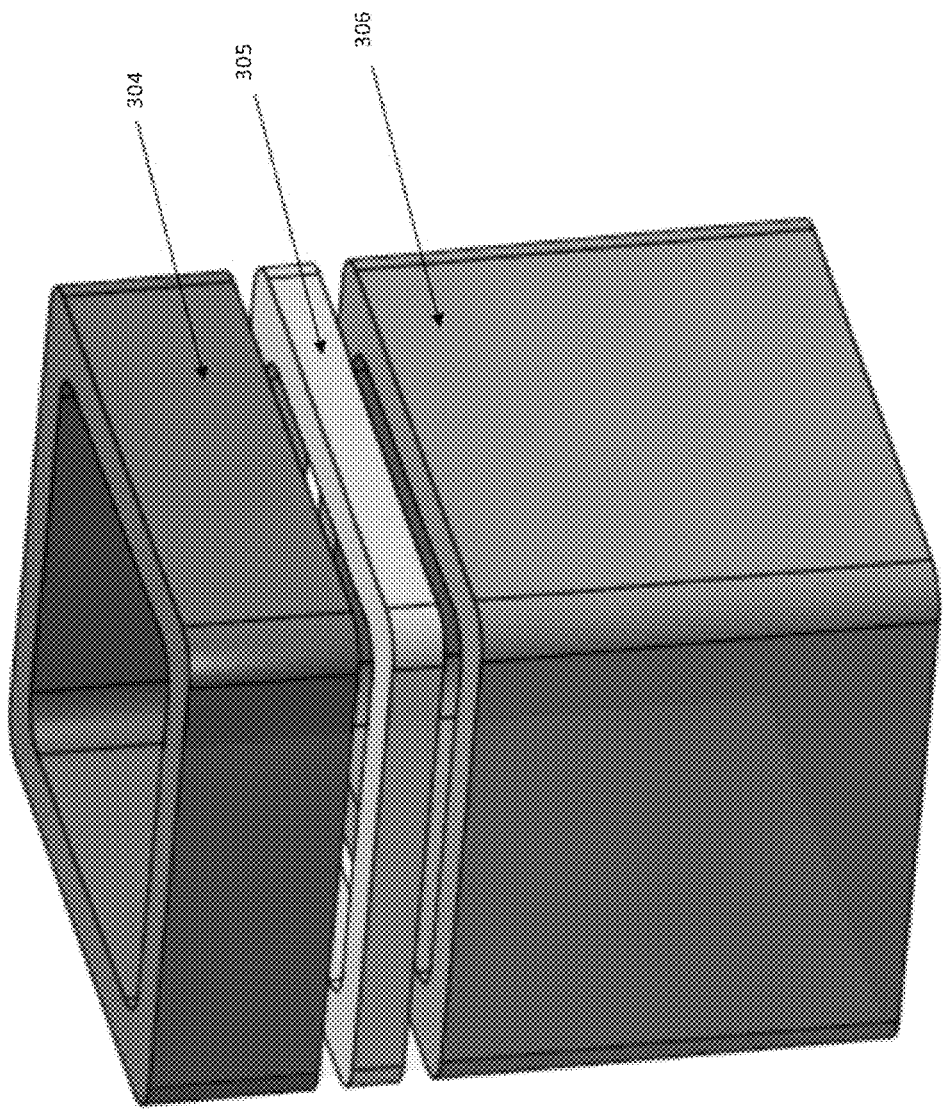
FIG. 3 depicts an exploded view of a chamber comprising a thermal break formed from a different material than neighboring chamber sections.

According to some embodiments, the chamber sections 214 and 216 and the thermal break 215 may be formed with the same, or substantially the same, cross sectional shapes. For instance, each of the chamber sections 214 and 216 and the thermal break 215 may be formed from cylindrical pieces of material (thereby having the same annular cross-section). FIG. 3 depicts an exploded view of a chamber 300 comprising chamber sections 304 and 306 with a thermal break 305 formed from a different material to the chamber sections arranged in between the chamber sections. In the example of FIG. 3, each of the chamber sections 304 and 306 and the thermal break 305 have a cross-sectional shape of a square or rectangle with rounded corners.

Various aspects of the SLS device 200 may be considered to determine appropriate dimensions of the chamber sections 214, 216 and the thermal break 215. For instance, the thermal conductivities of the chamber sections 214 and 216, the thermal conductivity of the powder bed, the size of the chamber (including the height and/or the surface area), the thermal emissivity of the powder, the top surface temperature of the powder bed, the desired temperatures at various heights within the powder bed, the speed at the powder moves downward during fabrication, the thickness of the chamber sections 214 and 216, or combinations thereof, may be considered in determining where the place the thermal break (i.e., the height of the thermal break). If the thermal break is arranged too close to the powder bed surface, for example, the cooler powder located lower in the chamber may be too close to the surface of the powder bed, leading to cooling of the surface and non-uniformity of the surface temperature. Conversely, if the thermal break is arranged too far from the powder bed surface, parts within the powder bed may be maintained at too high a temperature to avoid degradation of the parts (in other words, negating the advantages of the thermal break).

Figure 4B:
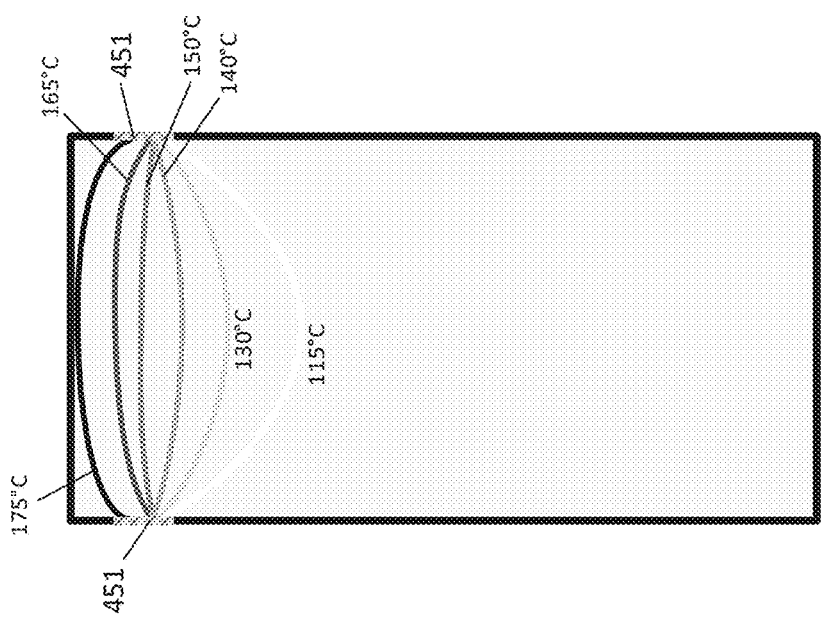
FIGS. 4A and 4B are cross-sectional views depicting illustrative temperature gradients of chambers without and with a thermal break, respectively, according to some embodiments.
Figure 4A:
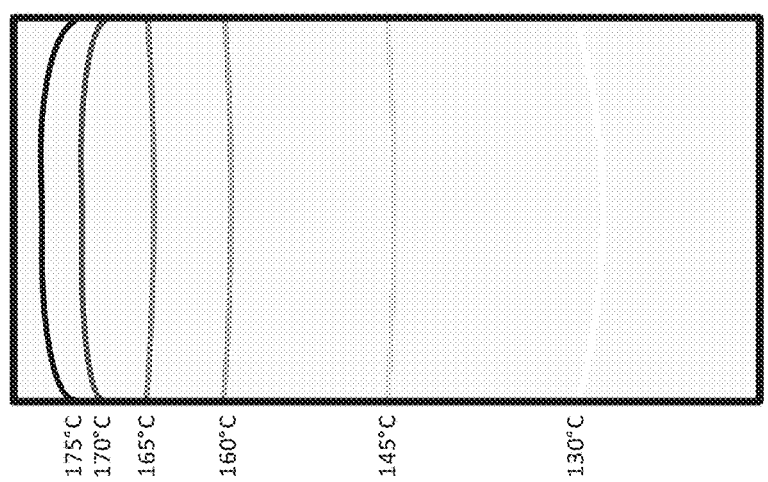

FIGS. 4A and 4B are cross-sectional views depicting illustrative temperature gradients of chambers without and with a thermal break, respectively, according to some embodiments. In each of FIGS. 4A and 4B, positions within a chamber having the same temperature are connected by a line; the shading of these lines is not intended to convey temperature and is provided only to clearly distinguish the different temperature gradients. Moreover, the temperature values depicted are not necessarily indicate of temperatures below consolidation nor temperatures at which thermal degradation occurs, but are merely provided for purposes of explanation and illustration.

In the example of FIG. 4A, chamber 400 comprises a powder and does not include a thermal break. As illustrated in FIG. 4A, the temperature of the powder gradually decreases downward from the uppermost surface, which may for instance heated to around 175° C. for a powder that consolidates at around 180° C. As a result of heat conduction through the walls of the chamber and the powder within the chamber, even powder located toward the bottom of the chamber may still be heated to around 130° C. As discussed above, such temperatures may degrade the powder and/or any parts formed within the powder (not shown in FIG. 4A).

In the example of FIG. 4B, chamber 450 comprises a powder and includes a thermal break 451. As illustrated in FIG. 4B, the temperature drops much more rapidly with distance from the uppermost surface of the powder in the chamber. As with the example of FIG. 4A, the uppermost surface of the powder is heated to around 175° C. for a powder that consolidates at around 180° C. In this case, however, the ability for heat to conduct downwards within the powder is limited by the thermal break 451, resulting in the powder temperature dropping to 130° C. at a much higher position than was the case of the powder of FIG. 4A.

Having thus described several aspects of at least one embodiment of this invention, it is to be appreciated that various alterations, modifications, and improvements will readily occur to those skilled in the art.

For instance, adjustments in the thermal profile of a powder bed may be produced by forming the chamber holding the powder bed from two different sections having different thermal conductivities (rather than, for instance, the three sections provided in the above example). For instance, an upper wall section may have a lower thermal conductivity than a lower wall section (whether as a result of different materials, different material thicknesses, and/or addition of thermal insulation, etc. as discussed above). In this sense, the upper wall section may be considered to be a large thermal break with an additional wall section below it. Moreover, more than three wall sections with differing thermal properties may also be considered to produce multiple thermal zones (which may include multiple thermal breaks).

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An additive fabrication device configured to produce three-dimensional objects by sintering a source material, the device comprising:
    a chamber comprising a first metal section that extends to a top of the chamber, a second metal section, and a thermal break arranged between the first metal section and the second metal section, the thermal break comprising plastic;
    a fabrication platform arranged within the chamber, configured to receive source material and to be lowered into the chamber as progressive layers of source material are deposited over the fabrication platform;
    a material deposition mechanism configured to deposit a layer of the source material over the fabrication platform, such that the layer of source material is arranged at the top of the chamber; and
    one or more heaters configured to heat at least the source material deposited by the material deposition mechanism.

2. The additive fabrication device of claim 1, wherein the first and second metal sections each have a thermal conductivity that is higher than a thermal conductivity of the thermal break.

3. The additive fabrication device of claim 1, wherein the first and second metal sections of the chamber are joined together by the thermal break.

4. The additive fabrication device of claim 1, wherein the thermal break is arranged at least 15 mm from the top of the chamber.

5. The additive fabrication device of claim 1, wherein the thermal break has a height of at least 20 mm.

6. The additive fabrication device of claim 1, wherein the second metal section extends to a bottom of the chamber.

* * * * *